(12) United States Patent
Nakazono et al.

(10) Patent No.: US 8,581,913 B2
(45) Date of Patent: Nov. 12, 2013

(54) DATA PROCESSING APPARATUS AND IMAGE PROCESSING APPARATUS

(75) Inventors: Keisuke Nakazono, Hino (JP); Akira Ueno, Hachioji (JP)

(73) Assignee: Olympus Corporation, Tokyo (JP)

( * ) Notice: Subject to any disclaimer, the term of this patent is extended or adjusted under 35 U.S.C. 154(b) by 958 days.

(21) Appl. No.: 12/696,901

(22) Filed: Jan. 29, 2010

(65) Prior Publication Data

US 2010/0199071 A1 Aug. 5, 2010

(30) Foreign Application Priority Data

Feb. 2, 2009 (JP) ................................ P2009-21246

(51) Int. Cl.
*G06F 15/16* (2006.01)
*G06T 1/20* (2006.01)

(52) U.S. Cl.
USPC .......................................... 345/502; 345/506

(58) Field of Classification Search
USPC .......................................... 345/502, 505, 506
See application file for complete search history.

(56) References Cited

U.S. PATENT DOCUMENTS

| | | | | |
|---|---|---|---|---|
| 7,623,718 | B2* | 11/2009 | Endo | 382/232 |
| 2005/0099510 | A1* | 5/2005 | Nakazono et al. | 348/231.3 |
| 2009/0024866 | A1* | 1/2009 | Yoshimoto et al. | 713/600 |

FOREIGN PATENT DOCUMENTS

| | | |
|---|---|---|
| CN | 101193300 | 6/2008 |
| JP | 05-304601 | 11/1993 |
| JP | 2000-148997 | 5/2000 |
| JP | 2000-312327 | 11/2000 |
| JP | 2005-078608 | 3/2005 |
| JP | 2007-323335 | 12/2007 |

OTHER PUBLICATIONS

Notice of Reasons for Rejection for Japanese Patent Application No. 2009-021246, mailed Aug. 7, 2012 (2 pgs.) with translation (3 pgs.).
Office Action for Chinese Patent Application No. 201010108554.5, mailed Jun. 15, 2011 (3 pgs.) with translation (2 pgs.).

* cited by examiner

*Primary Examiner* — Hau Nguyen
(74) *Attorney, Agent, or Firm* — John C. Pokotylo; Straub & Pokotylo

(57) ABSTRACT

A data processing apparatus in which pipeline processing is performed comprises a control unit that controls a data processing sequence, a first processing unit that begins first data processing by inputting data on the basis of a start signal, outputs data subjected to the first data processing, and outputs a completion signal to the control unit after completing the first data processing, and a second processing unit that begins second data processing by inputting the data subjected to the first data processing on the basis of a start signal, outputs data subjected to the second data processing, and outputs a completion signal to the control unit after completing the second data processing. The control unit outputs a following start signal to the first processing unit and the second processing unit upon reception of the completion signal of the first data processing and the second data processing respectively.

19 Claims, 5 Drawing Sheets

//DATA PROCESSING APPARATUS AND IMAGE PROCESSING APPARATUS

FIELD OF THE INVENTION

This invention relates to a technique for increasing the speed of data processing using a pipeline system.

BACKGROUND OF THE INVENTION

In a conventional, well known image processing technique employing a so-called pipeline system, processing is performed in a plurality of processing units connected in series by dividing a single frame of image data into regions of a predetermined size, performing processing on each of the divided regions in each processing unit, and then transmitting the processed data to the next processing unit (see JP2000-312327A). With the image processing technique described in JP2000-312327A, processing is performed on a single divided region sequentially in each processing unit, and when the processing of a final processing unit is complete, the data in the next divided region are input into the first processing unit.

SUMMARY OF THE INVENTION

A data processing apparatus of an aspect of the present invention in which pipeline processing is performed by a plurality of data processing units for processing data comprises a control unit that controls a data processing sequence, a first processing unit that begins first data processing by inputting data on the basis of a start signal from the control unit, outputs data subjected to the first data processing, and outputs a signal indicating completion of the first data processing to the control unit after completing the first data processing, and a second processing unit that begins second data processing by inputting the data subjected to the first data processing on the basis of a start signal from the control unit, outputs data subjected to the second data processing, and outputs a signal indicating completion of the second data processing to the control unit after completing the second data processing. The control unit outputs a following start signal to the first processing unit upon reception of the signal indicating completion of the first data processing from the first processing unit, and outputs a following start signal to the second processing unit upon reception of the signal indicating completion of the second data processing from the second processing unit.

An image processing apparatus of another aspect of the present invention in which pipeline processing is performed by a plurality of image processing units for processing image data comprises a control unit that controls an image processing sequence, a memory that is capable of writing and reading the image data, an input DMA unit that starts to input a predetermined amount of image data from the memory on the basis of a start signal from the control unit and outputs a signal indicating completion to the control unit after completing output of the input predetermined amount of image data, a first image processing unit that executes first image processing by inputting the image data output from the input DMA unit on the basis of a start signal from the control unit, outputs image data subjected to the first image processing, and outputs a signal indicating completion to the control unit after completing the first image processing, a second image processing unit that executes second image processing by inputting the image data output from the first image processing unit on the basis of a start signal from the control unit, outputs image data subjected to the second image processing, and outputs a signal indicating completion to the control unit after completing the second image processing, and an output DMA unit that inputs a start signal from the control unit, inputs the image data output from the second image processing unit, writes the image data to the memory, and outputs a signal indicating completion to the control unit after completing the writing.

DESCRIPTION OF THE PREFERRED EMBODIMENT

An embodiment in which this invention is applied to an image processing apparatus will be described below.

Figure 1:
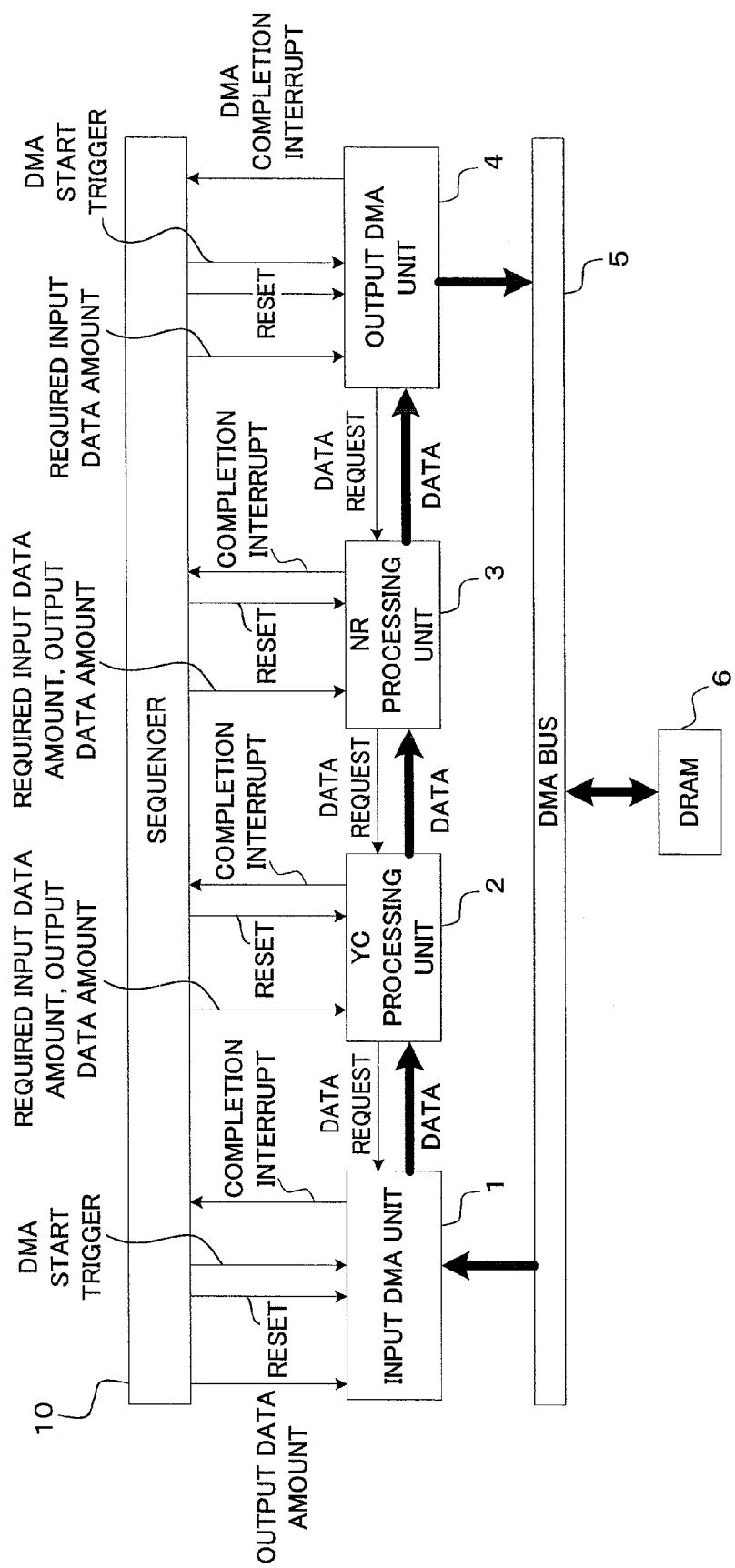
FIG. 1 is a block diagram showing an image processing apparatus according to this embodiment.

FIG. 1 is a block diagram showing an image processing apparatus according to this embodiment. The image processing apparatus according to this embodiment comprises an input DMA unit 1, a YC processing unit 2, an NR processing unit 3, an output DMA unit 4, a DMA bus 5, a DRAM 6, and a sequencer 10. The image processing apparatus is installed in an electronic imaging device such as a digital camera, for example.

The DRAM 6 stores data (to be referred to hereafter as image data) obtained by performing predetermined pre-processing on an imaging signal output from an image sensor such as a CCD installed in the electronic imaging device. In the image processing apparatus according to this embodiment, a single frame of image data is divided into a plurality of small rectangular blocks of image data (to be referred to hereafter as block lines), and processing is performed on each block line.

As shown in FIG. 1, the input DMA unit 1, YC processing unit 2, NR processing unit 3, and output DMA unit 4 are connected in series, and these units 1 to 4 perform so-called pipeline data processing on each block line in sequence. By dividing the image data into a plurality of block lines and performing pipeline data processing thereon, a transferred data amount can be reduced and the speed of the processing can be increased. The sequencer 10 controls a data processing sequence of the respective processing units 1 to 4.

Operations of the respective units will now be described using FIGS. 2 and 3.

Figure 2:
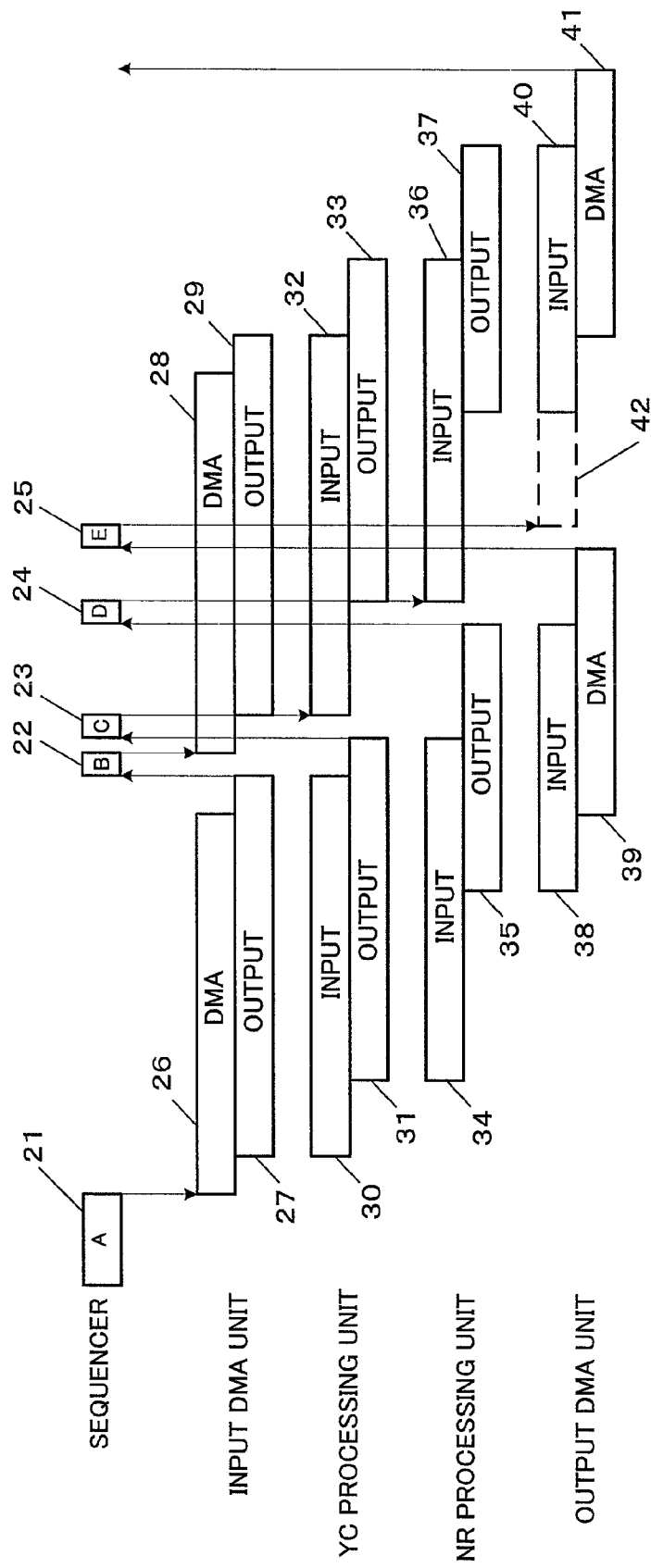
FIG. 2 is a time chart showing processing timings of the sequencer, input DMA unit, YC processing unit, NR processing unit, and output DMA unit in order from the top of the figure.
Figure 3:
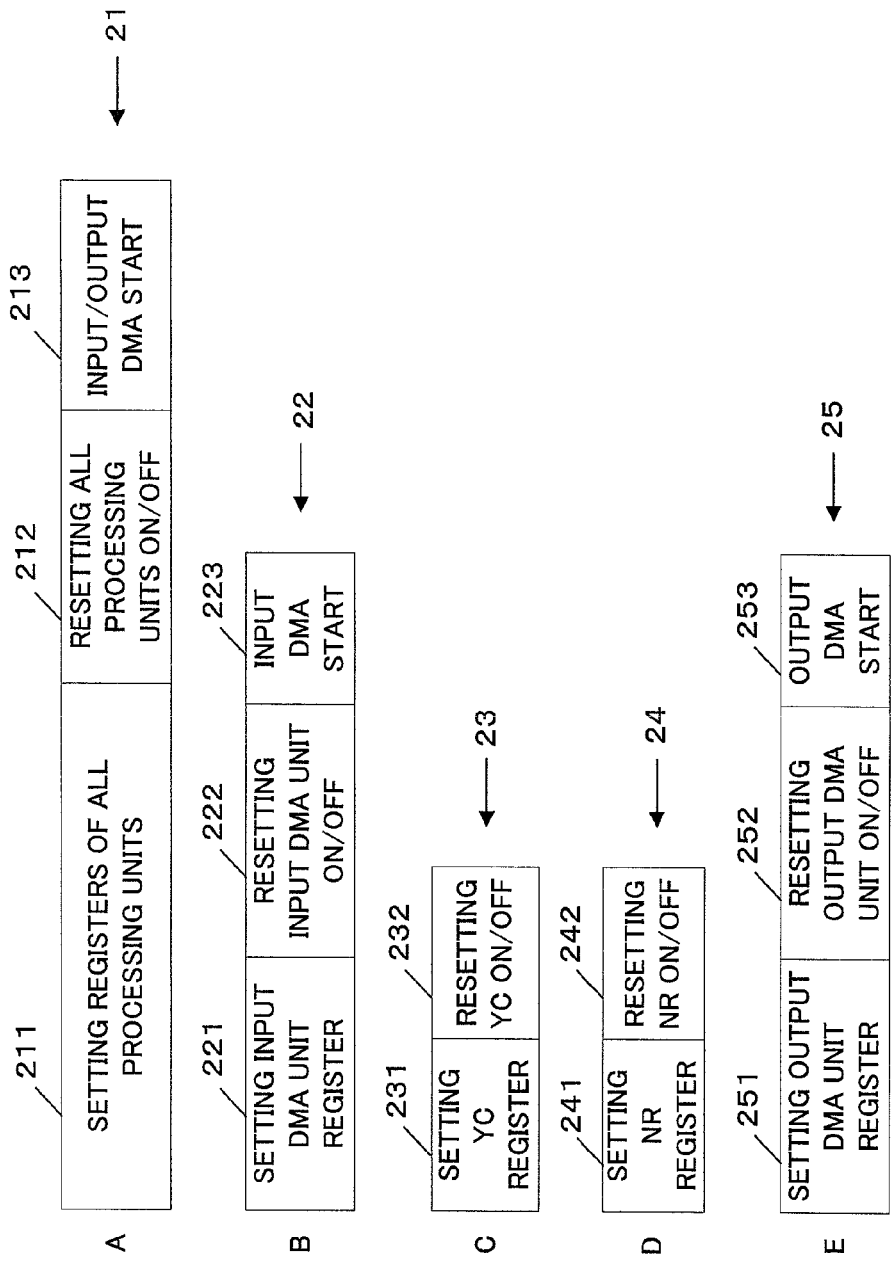
FIG. 3 shows processing performed by the sequencer in detail.

FIG. 2 is a time chart showing processing timings of the sequencer 10, input DMA unit 1, YC processing unit 2, NR processing unit 3, and output DMA unit 4 in order from the top of the figure. FIG. 3 shows processing 21 to 25 performed by the sequencer 10 in detail.

To begin processing on a single frame of image data, first, the sequencer 10 performs processing 21. The content of the processing 21 performed by the sequencer 10 will now be described in detail with reference to FIG. 3. First, the sequencer 10 performs processing on the input DMA unit 1, YC processing unit 2, NR processing unit 3, and output DMA unit 4 to set parameters required in various types of image processing, required output data amounts of the respective processing units, required input data amounts of the respective processing units, and so on in registers of the respective processing units 1 to 4 (processing 211). It should be noted that the required output data amounts are set in the respective registers of the processing units 1 to 3, while the required input data amounts are set in the respective registers of the processing units 2 to 4. The required output data amount and required input data amount are set in accordance with the processing content of the processing units 1 to 3 and the processing content of the processing units 2 to 4, respectively.

Next, the sequencer 10 performs processing (processing 212) to reset the processing units 1 to 4 and then cancel the resetting. By resetting the respective processing units 1 to 4, unprocessed data in the interior of the processing units 1 to 4 are treated as if never input. Finally, the sequencer 10 outputs an input DMA start trigger signal into the input DMA unit 1 and outputs an output DMA start trigger signal to the output DMA unit 4 (processing 213).

As shown in FIG. 2, the input DMA unit 1 starts input DMA (Direct. Memory Access) on the basis of the input DMA start trigger signal from the sequencer 10. As a result, one block line of data is input into the input DMA unit 1 from the DRAM 6 via the DMA bus 5. The block line input into the input DMA unit 1 is output to the YC processing unit 2 in accordance with a data request signal from the YC processing unit. 2.

Figure 4:
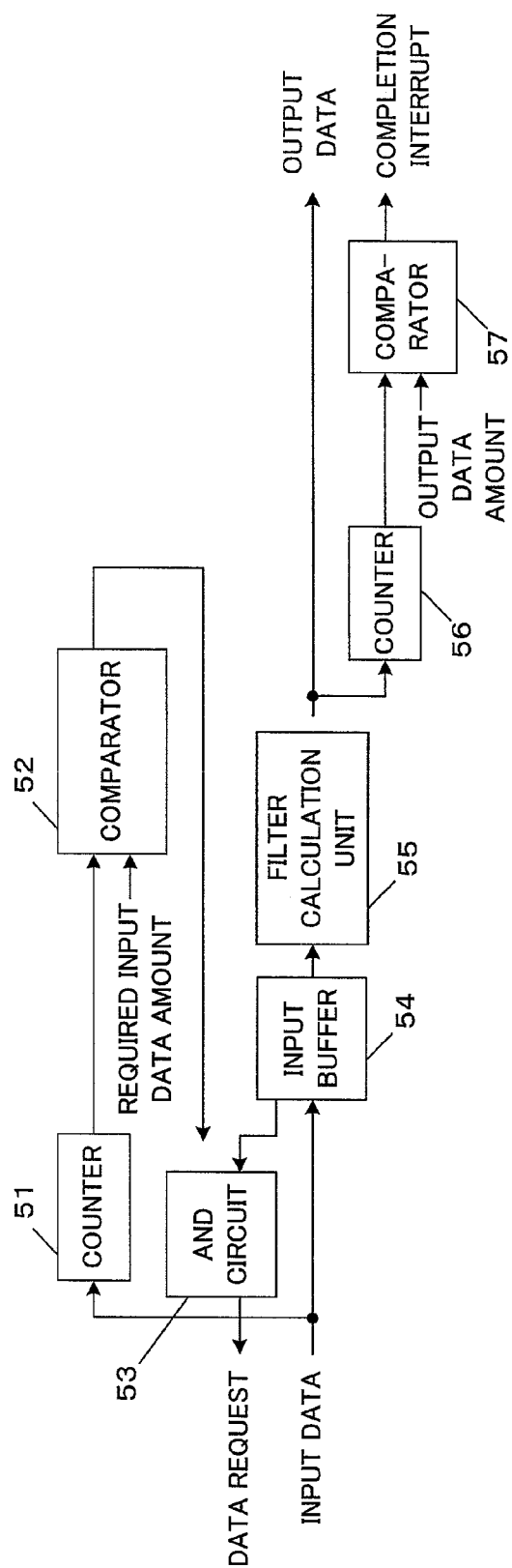
FIG. 4 is a block diagram showing in detail the internal constitution of the YC processing unit and NR processing unit.

FIG. 4 is a block diagram showing in detail the internal constitution of the YC processing unit 2 and NR processing unit 3. The YC processing unit 2 and NR processing unit 3 respectively comprise a counter 51, a comparator 52, an AND circuit 53, an input buffer 54, a filter calculation unit 55, a counter 56, and a comparator 57. A single block line of data is processed by the respective processing units 1 to 4 after being divided into even smaller data regions. The counter 51 counts an amount of small region data input from a previous stage processing unit, and outputs a count value to the comparator 52. The previous stage processing unit is the input DMA unit 1 in the case of the YC processing unit 2 and the YC processing unit 2 in the case of the NR processing unit 3.

The comparator 52 compares the required input data amount set in the register by the sequencer 10 with the count value input from the counter 51, and outputs a comparison result to the AND circuit 53.

The divided small region data are input sequentially into the input buffer 54 from the previous stage processing unit. When a comparison result indicating that the count value is smaller than the required input data amount and a signal indicating that a predetermined capacity is available in the input buffer 54 are input into the AND circuit 53, the AND circuit 53 outputs a data request signal to the previous stage processing unit. When the count value matches the required input data amount, the AND circuit 53 halts (prohibits) output of the data request signal to the previous stage processing unit. The sequencer 10 then performs resetting and resetting cancellation, whereupon output of the data request signal is resumed.

The filter calculation unit 55 reads the data stored temporarily in the input buffer 54 and performs filter calculation processing thereon. In the YC processing unit 2, processing is performed to generate a Y (luminance) signal and a C (color) signal, and in the NR processing unit 3, noise reduction processing is performed. Following the filter calculation processing, the data are output to a latter stage processing unit in accordance with a data request signal from the latter stage processing unit. The latter stage processing unit is the NR processing unit 3 in the case of the YC processing unit 2 and the output. DMA unit 4 in the case of the NR processing unit 3.

The counter 56 counts the amount of data subjected to filter calculation processing by the filter calculation unit 55, and outputs a count value to the comparator 57. The comparator 57 compares the required output data amount set in the register by the sequencer 10 with the count value input from the counter 56, and when the count value is equal to the required output data amount, the comparator 57 outputs a completion interrupt signal to the sequencer 10.

The input DMA unit 1 comprises at least the counter 56 and comparator 57 shown in FIG. 4, and when the output data count value is equal to the required output data amount set in the register by the sequencer 10, the input DMA unit 1 outputs a completion interrupt signal to the sequencer 10.

The output DMA unit 4 comprises at least the counter 51, the comparator 52 and the AND circuit 53 shown in FIG. 4, and when the input data count value is equal to the required input data amount set in the register by the sequencer 10, the output DMA unit 4 halts (prohibits) data requests to the NR processing unit 3. The sequencer 10 then performs resetting and resetting cancellation, whereupon output of the data request signal is resumed.

Returning to FIG. 2, the input DMA unit 1 starts input DMA (Direct Memory Access) on the basis of the input DMA start trigger signal from the sequencer 10. As a result, one block line is input into the input DMA unit 1 from the DRAM 6 via the DMA bus 5 (processing 26). The block line input into the input DMA unit 1 is output to the YC processing unit 2 in accordance with a data request signal from the YC processing unit 2 (processing 27). Further, as described above, when the required output data amount set in the register matches the actual output data amount counted by the counter, the input DMA unit 1 outputs a completion interrupt signal to the sequencer 10. On the basis of the completion interrupt signal, the sequencer 10 begins processing 22.

The content of the processing 22 performed by the sequencer 10 will now be described in detail with reference to FIG. 3. The sequencer 10 sets the required output data amount and so on of the input DMA unit 1 in the register of the input DMA unit 1 (processing 221). Next, the sequencer 10 subjects the input DMA unit 1 to resetting and resetting cancellation (processing 222), and then outputs the input DMA start trigger signal to the input DMA unit 1 (processing 223).

Returning to FIG. 2, the input DMA unit 1 begins input DMA on the basis of the input DMA start trigger signal from the sequencer 10. As a result, the next single block line is input into the input DMA unit 1 from the DRAM 6 via the DMA bus 5 (processing 28). The block line input into the input DMA unit 1 is output to the YC processing unit 2 in accordance with a data request signal from the YC processing unit 2 (processing 29). Thereafter, similar processing is performed repeatedly.

In accordance with the data output from the input DMA unit 1 (processing 27), the YC processing unit 2 inputs data from the input DMA unit 1 (processing 30), performs processing on the input data to generate the aforementioned Y signal and C signal, and then outputs the processed data to the NR processing unit 3 in accordance with a data request signal from the NR processing unit 3 (processing 31). Further, as described above, when the required output data amount set in the register matches the actual output data amount counted by the counter, the YC processing unit 2 outputs a completion interrupt signal to the sequencer 10. On the basis of the completion interrupt signal, the sequencer 10 begins processing 23.

The content of the processing 23 performed by the sequencer 10 will now be described in detail with reference to FIG. 3. The sequencer 10 sets the required input data amount, required output data amount, and so on of the YC processing unit 2 in the register of the YC processing unit 2 (processing 231). The sequencer 10 then subjects the YC processing unit 2 to resetting and resetting cancellation (processing 232).

Returning to FIG. 2, when resetting of the YC processing unit 2 is canceled, output of the data request signal to the previous stage input DMA unit 1 is resumed. In accordance with the data output from the input DMA unit 1 (processing 29), the YC processing unit 2 inputs data from the input DMA unit 1 (processing 32). The YC processing unit 2 then performs processing on the input data to generate the Y signal and C signal, and then outputs the processed data to the NR processing unit 3 in accordance with a data request signal from the NR processing unit 3 (processing 33). Thereafter, similar processing is performed repeatedly.

In accordance with the data output from the YC processing unit 2 (processing 31), the NR processing unit 3 inputs data from the YC processing unit 2 (processing 34), performs noise reduction processing on the input data, and then outputs the processed data to the output DMA unit 4 in accordance with a data request signal from the output DMA unit 4 (processing 35). Further, as described above, when the required output data amount set in the register matches the actual output data amount counted by the counter, the NR processing unit 3 outputs a completion interrupt signal to the sequencer 10. On the basis of the completion interrupt signal, the sequencer 10 begins processing 24.

The content of the processing 24 performed by the sequencer 10 will now be described in detail with reference to FIG. 3. The sequencer 10 sets the required input data amount, required output data amount, and so on of the NR processing unit 3 in the register of the NR processing unit 3 (processing 241). Next, the sequencer 10 subjects the NR processing unit 3 to resetting and resetting cancellation (processing 242).

Returning to FIG. 2, when resetting of the NR processing unit 3 is canceled, output of the data request signal to the previous stage YC processing unit 2 is resumed. In accordance with the data output from the YC processing unit 2 (processing 33), the NR processing unit 3 inputs data from the YC processing unit 2 (processing 36). The NR processing unit 3 then performs noise reduction processing on the input data, and then outputs the processed data to the output DMA unit 4 in accordance with a data request signal from the output. DMA unit 4 (processing 37). Thereafter, similar processing is performed repeatedly.

In accordance with the data output from the NR processing unit 3 (processing 35), the output DMA unit 4 inputs data from the NR processing unit 3 (processing 38), and then begins output. DMA (processing 39). In other words, data are stored sequentially in the DRAM 6 via the DMA bus 5. Further, when output DMA of the input data is complete, the output DMA unit 4 outputs a completion interrupt signal to the sequencer 10. On the basis of the completion interrupt signal, the sequencer 10 begins processing 25.

The content of the processing 25 performed by the sequencer 10 will now be described in detail with reference to FIG. 3. The sequencer 10 sets the required input data amount and so on of the output DMA unit 4 in the register of the output DMA unit 4 (processing 251). Next, the sequencer 10 subjects the output DMA unit 4 to resetting and resetting cancellation (processing 252), and then outputs the output DMA start trigger signal to the output DMA unit 4 (processing 253).

Returning to FIG. 2, when resetting of the output. DMA unit 4 is canceled, output of the data request signal to the previous stage NR processing unit 3 is resumed. In accordance with the data output from the NR processing unit 3 (processing 37), the output DMA unit 4 inputs data from the NR processing unit 3 (processing 40), and begins output DMA (processing 41). Thereafter, similar processing is performed repeatedly.

It should be noted that in the example shown in FIG. 2, when resetting of the output DMA unit 4 is canceled by the sequencer 10 such that the data request signal is output to the NR processing unit 3 from the output DMA unit 4, the noise reduction processing performed by the NR processing unit. 3 is not yet complete, and therefore data output from the NR processing unit. 3 does not begin immediately. In other words, an interval 42 in which data input is not performed exists between output of the data request signal and data input in the output DMA unit 4.

In the image processing apparatus according to this embodiment, an image processing apparatus in which pipeline processing is performed by a plurality of image processing units for processing image data comprises: the sequencer (control unit) 10 for controlling the image processing sequence; the DRAM (memory) 6 that is capable of writing and reading the image data; the input DMA unit 1 that starts to input a predetermined amount of image data from the DRAM 6 on the basis of a start signal from the sequencer 10 and outputs a signal indicating completion to the sequencer 10 after completing output of the input predetermined amount of image data; the YC processing unit (first image processing unit) 2 that executes first image processing (YC signal generation processing) by inputting the image data output from the input DMA unit 1 on the basis of a start signal from the sequencer 10, outputs image data subjected to the first image processing, and outputs a signal indicating completion to the sequencer 10 after completing the first image processing; the NR processing unit (second image processing unit) 3 that executes second image processing (noise reduction processing) by inputting the image data output from the YC processing unit 2 on the basis of a start signal from the sequencer 10, outputs image data subjected to the second image processing, and outputs a signal indicating completion to the sequencer 10 after completing the second image processing; and the output DMA unit 4 that inputs a start signal from the sequencer 10, inputs the image data output from the NR processing unit 3, writes the image data to the DRAM 6, and outputs a signal indicating completion to the sequencer 10 after completing the writing. With this constitution, the YC processing unit 2 and NR processing unit 3 can perform data processing independently. For example, the YC processing unit 2 need not wait for the NR processing unit 3 to complete the noise reduction processing before inputting the next data and beginning the YC signal generation processing. In other words, the speed of the pipeline image processing can be increased.

The sequencer 10 outputs respective required output data amounts to the input DMA unit 1, the YC processing unit 2, and the NR processing unit 3, and the input DMA unit 1, YC processing unit 2, and NR processing unit 3 respectively output the signal indicating completion to the sequencer 10 when the amount of data subjected to the corresponding processing matches the corresponding required output data amount. Thus, the sequencer 10 can comprehend the respective data completion timings of the processing units 1 to 3 accurately and output a start signal for starting the next processing to the respective processing units 1 to 3 on the basis of the signal indicating completion.

In the image processing apparatus according to this embodiment in particular, the sequencer 10 outputs a required input data amount indicating an amount of image data to be processed by the YC processing unit 2 to the YC processing unit 2. The YC processing unit 2 inputs image data by outputting an image data request signal to the input DMA unit 1, counts an amount of input data, and prohibits output of the image data request signal to the input DMA unit 1 when the amount of input data matches the required input data amount. The input DMA unit 1 outputs image data to the YC processing unit 2 while the image data request signal is input therein.

Similarly, the sequencer 10 outputs a required input data amount indicating an amount of image data to be processed by the NR processing unit 3 to the NR processing unit 3. The NR processing unit 3 inputs image data by outputting an image data request signal to the YC processing unit 2, counts an amount of input data, and prohibits output of the image data request signal to the YC processing unit 2 when the amount of input data matches the required input data amount. The YC processing unit 2 outputs image data to the NR processing unit 3 while the image data request signal is input therein.

Further, the sequencer 10 outputs a required input data amount indicating an amount of image data to be processed by the output. DMA unit 4 to the output DMA unit 4. The output. DMA unit 4 inputs image data by outputting an image data request signal to the NR processing unit 3, counts an amount of input data, and prohibits output of the image data request signal to the NR processing unit 3 when the amount of input data matches the required input data amount. The NR processing unit 3 outputs image data to the output DMA unit 4 while the image data request signal is input therein.

With this constitution, the respective processing units 1 to 3 only output data to the latter stage processing unit when the image data request signal is input therein from the latter stage processing unit. This will now be described using FIG. 5.

Figure 5:
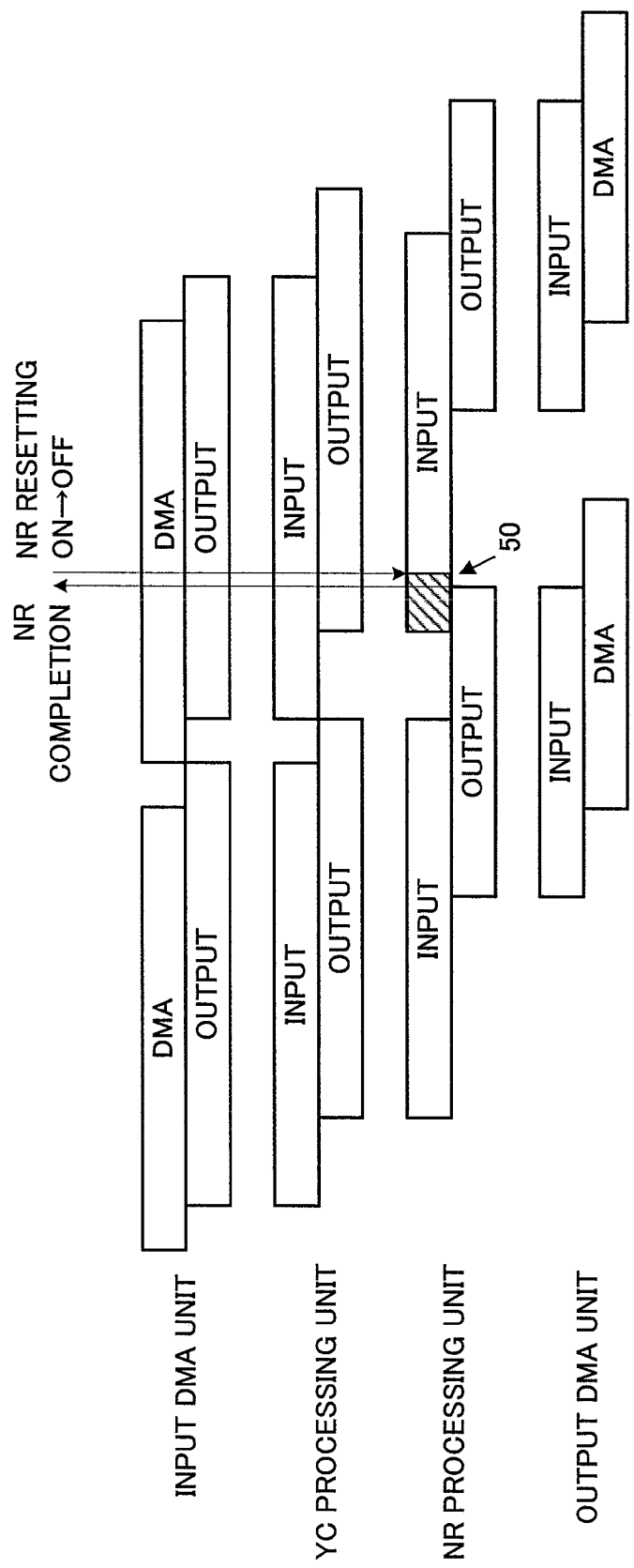
FIG. 5 is a view showing data processing timings in a case where an image data request signal is not input from a latter stage processing unit.

FIG. 5 is a view showing data processing timings in a case where an image data request signal is not input from a latter stage processing unit. According to this example, each processing unit outputs processed data to the latter stage processing unit after completing data processing. In this case, depending on the data processing completion timing, the next data may be input from the previous stage processing unit before the data processing is complete. More specifically, the sequencer 10 performs resetting after the next data are input from the previous stage processing unit (see reference numeral 50). When resetting is performed during data input, the input data disappear, making it seem as if they were never input, and as a result, the data are not processed correctly.

However, with the image processing apparatus according to this embodiment, output of the image data request signal to the previous stage is prohibited when the input data amount matches the required input data amount, and therefore the next data are not input until the data processing is complete and reset ON/OFF has been performed by the sequencer 10. In other words, resetting is not performed during data input.

This invention is not limited to the embodiment described above, and may be subjected to various modifications and applications within a scope that does not depart from the spirit thereof. For example, in the above description, image data are used as processing subject data, but the processing subject data are not limited to image data. More specifically, this invention may be applied not only to an image processing apparatus, but also to a data processing apparatus in which pipeline processing is performed by a plurality of data processing units for processing data.

In FIG. 1, two processing units 2, 3 are provided between the input DMA unit 1 and the output DMA unit 4, but three or more processing units may be provided. The processing units provided between the input DMA unit 1 and output. DMA unit 4 are constituted identically to the YC processing unit 2 and NR processing unit 3 shown in FIG. 4, and operations thereof are also identical apart from the processing performed in the interior of the filter calculation unit 55.

This application claims priority based on JP2009-21246, filed with the Japan Patent Office on Feb. 2, 2009, the entire contents of which are incorporated into this specification by reference.

What is claimed is:

1. A data processing apparatus in which pipeline processing is performed by a plurality of data processing units for processing data, comprising:

a control unit that controls a data processing sequence;

a first processing unit that begins first data processing by inputting data on the basis of a start signal from the control unit, outputs data subjected to the first data processing, and outputs a signal indicating completion of the first data processing to the control unit after completing the first data processing; and a second processing unit that begins second data processing by inputting the data subjected to the first data processing on the basis of a start signal from the control unit, outputs data subjected to the second data processing, and outputs a signal indicating completion of the second data processing to the control unit after completing the second data processing, wherein the first processing unit inputs data by block unit, and halts input and output of data until a following start signal is input by the control unit after outputting data by block unit subjected to the first data processing, the second processing unit inputs data by block unit, and halts input and output of data until a following start signal is input by the control unit after outputting data by block unit subjected to the second data processing, and the control unit outputs a following start signal to the first processing unit upon reception of the signal indicating completion of the first data processing from the first processing unit, and outputs a following start signal to the second processing unit upon reception of the signal indicating completion of the second data processing from the second processing unit.

2. The data processing apparatus as defined in claim 1, wherein the control unit outputs a required output data amount to the first processing unit or the second processing unit, and the first processing unit or the second processing unit outputs the signal indicating completion of the first data processing or the signal indicating completion of the second data processing when an amount of data subjected to the first data processing or the second data processing matches the required output data amount.

3. The data processing apparatus as defined in claim 1, wherein the control unit outputs a required input data amount to the second processing unit, the second processing unit outputs a data input request signal for requesting data input to the first processing unit until an amount of input data matches the required input data amount, and the first processing unit outputs data to the second processing unit while the data input request signal is input therein from the second processing unit, but does not output data to the second processing unit when the data input request signal is not input.

4. The data processing apparatus as defined in claim 2, wherein the signal indicating completion is an interrupt signal.

5. The data processing apparatus as defined in claim 1, further comprising at least one processing unit which is provided between the first processing unit and the second processing unit, begins data processing by inputting data from a previous stage processing unit on the basis of a start signal from the control unit, outputs data subjected to the data processing to a latter stage processing unit, and outputs a signal indicating completion of the data processing to the control unit after completing the data processing.

6. An image processing apparatus in which pipeline processing is performed by a plurality of image processing units for processing image data, comprising:
 a control unit that controls an image processing sequence;
 a memory that is capable of writing and reading the image data;
 an input DMA unit that starts to input a predetermined amount of image data from the memory on the basis of a start signal from the control unit and outputs a signal indicating completion to the control unit after completing output of the input predetermined amount of image data;
 a first image processing unit that executes first image processing by inputting the image data output from the input DMA unit on the basis of a start signal from the control unit, outputs image data subjected to the first image processing, and outputs a signal indicating completion to the control unit after completing the first image processing;
 a second image processing unit that executes second image processing by inputting the image data output from the first image processing unit on the basis of a start signal from the control unit, outputs image data subjected to the second image processing, and outputs a signal indicating completion to the control unit after completing the second image processing; and
 an output DMA unit that inputs a start signal from the control unit, inputs the image data output from the second image processing unit, writes the image data to the memory, and outputs a signal indicating completion to the control unit after completing the writing,
 wherein the input DMA unit inputs data by block unit, and halts input and output of data until a following start signal is input by the control unit after outputting data by block unit,
 the first image processing unit inputs data by block unit, and halts input and output of data until a following start signal is input by the control unit after outputting data by block unit subjected to the first image processing, and
 the second image processing unit inputs data by block unit, and halts input and output of data until a following start signal is input by the control unit after outputting data by block unit subjected to the second image processing, and
 the output DMA unit inputs data by block unit, and halts input and output of data until a following start signal is input by the control unit after outputting data by block unit.

7. The image processing apparatus as defined in claim 6, wherein the control unit outputs respective required output data amounts to the input DMA unit, the first image processing unit, and the second image processing unit, and
 the input DMA unit, the first image processing unit, and the second image processing unit respectively output the signal indicating completion to the control unit when an amount of data subjected to the corresponding processing matches the corresponding required output data amount.

8. The image processing apparatus as defined in claim 6, wherein the control unit outputs a required input data amount indicating an amount of image data to be processed by the first image processing unit to the first image processing unit,
 the first image processing unit inputs image data by outputting an image data request signal to the input DMA unit, counts an amount of input data, and prohibits output of the image data request signal to the input DMA unit when the amount of input data matches the required input data amount, and
 the input DMA unit outputs image data to the first image processing unit while the image data request signal is input therein.

9. The image processing apparatus as defined in claim 6, wherein the control unit outputs a required input data amount indicating an amount of image data to be processed by the second image processing unit to the second image processing unit,
 the second image processing unit inputs image data by outputting an image data request signal to the first image processing unit, counts an amount of input data, and prohibits output of the image data request signal to the first image processing unit when the amount of input data matches the required input data amount, and
 the first image processing unit outputs image data to the second image processing unit while the image data request signal is input therein.

10. The image processing apparatus as defined in claim 6, wherein the control unit outputs a required input-data amount indicating an amount of image data to be processed by the output DMA unit to the output DMA unit,
 the output DMA unit inputs image data by outputting an image data request signal to the second image processing unit, counts an amount of input data, and prohibits output of the image data request signal to the second image processing unit when the amount of input data matches the required input data amount, and
 the second image processing unit outputs image data to the output DMA unit while the image data request signal is input therein.

11. The image processing apparatus as defined in claim 7, wherein the signal indicating completion is an interrupt signal.

12. The image processing apparatus as defined in claim 6; further comprising at least one image processing unit which is provided between the first image processing unit and the second image processing unit, begins image processing by inputting image data from a previous stage image processing unit on the basis of a start signal from the control unit, outputs image data subjected to the image processing to a latter stage image processing unit, and outputs a signal indicating completion of the image processing to the control unit after completing the image processing.

13. The image processing apparatus as defined in claim 6, wherein the input DMA unit, the first image processing unit, the second image processing unit, and the output DMA unit perform pipeline processing on each of a plurality of blocks obtained by dividing the image data.

14. The image processing apparatus as defined in claim 6, wherein the first image processing unit performs processing to generate a luminance signal and a color signal.

15. The image processing apparatus as defined in claim 6, wherein the second image processing unit performs noise reduction processing.

16. The image processing apparatus as defined in claim 7, wherein the input DMA unit, the first image processing unit, and the second image processing unit respectively comprise at least a counter and a comparator,
- the amount of data subjected to the corresponding processing is counted by the counter and compared with the corresponding required output data amount by the comparator, and
- when the counted data amount matches the required output data amount, the signal indicating completion is output to the control unit.

17. The image processing apparatus as defined in claim 8, wherein the first image processing unit comprises a counter, a comparator, and an AND circuit,
- the counter counts an amount of data output by the input DMA unit and outputs the counted amount to the comparator,
- the comparator compares the counted amount with the required input data amount and outputs a comparison result to the AND circuit, and
- when the counted amount matches the required input data amount, the AND circuit prohibits output of the image data request signal to the input DMA unit.

18. The image processing apparatus as defined in claim 9, wherein the second image processing unit comprises a counter, a comparator, and an AND circuit,
- the counter counts an amount of data output by the first image processing unit and outputs the counted amount to the comparator,
- the comparator compares the counted amount with the required input data amount and outputs a comparison result to the AND circuit, and
- when the counted amount matches the required input data amount, the AND circuit prohibits output of the image data request signal to the first image processing unit.

19. The image processing apparatus as defined in claim 10, wherein the output DMA unit comprises a counter, a comparator, and an AND circuit, the counter counts an amount of data output by the second image processing unit and outputs the counted amount to the comparator,
- the comparator compares the counted amount with the required input data amount and outputs a comparison result to the AND circuit, and
- when the counted amount matches the required input data amount, the AND circuit prohibits output of the image data request signal to the second image processing unit.

* * * * *